(12) United States Patent
Kamei et al.

(10) Patent No.: US 6,402,218 B1
(45) Date of Patent: Jun. 11, 2002

(54) SEAT BELT PRETENSIONER DEVICE POWERED BY VEHICLE BODY DEFORMATION

(75) Inventors: Takahiro Kamei; Tatsuo Iwabe; Yasushi Kawamura; Makoto Tsuruta; Yasuki Motozawa; Kazuya Yoshida, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/621,411

(22) Filed: Jul. 21, 2000

(30) Foreign Application Priority Data

Jul. 23, 1999 (JP) .......................................... 11-208867

(51) Int. Cl.[7] ................................................. B60N 2/02
(52) U.S. Cl. .................................... 296/68.1; 297/216.1
(58) Field of Search .............................. 296/68.1, 188, 296/189; 297/216.1, 216.16, 216.18

(56) References Cited

U.S. PATENT DOCUMENTS 5,219,206 A * 6/1993 Anthony et al. ....... 296/68.1 X
5,642,916 A * 7/1997 Dybro et al. .......... 296/68.1 X
6,186,574 B1   2/2001 Motozawa et al. ........ 296/68.1
6,193,296 B1   2/2001 Motozawa et al. ........ 296/68.1
6,254,164 B1 * 7/2001 Kawamura et al. ........ 296/68.1
2001/0002761 A1 * 6/2001 Tsuruta et al. .............. 296/189
2001/0013711 A1 * 8/2001 Motozawa et al. ........ 296/68.1
2001/0015565 A1 * 8/2001 Motozawa et al. ........ 296/68.1

FOREIGN PATENT DOCUMENTS

JP          7-101354          4/1995

* cited by examiner

Primary Examiner—Joseph D. Pape
(74) Attorney, Agent, or Firm—Skjerven Morrill LLP

(57) ABSTRACT

Provided is a seat belt pretensioner device for a seat belt having a plurality of anchor points attached to different parts of a vehicle body which includes a G control vehicle body member which deforms in a different pattern from a remaining part of the vehicle body at the time of a vehicle crash. One of the anchor points, which typically consists of a seat belt buckle, is attached to the G control vehicle body member via a force transmitting member such as a cable member which is adapted to move the anchor point in a direction to increase a tension of the seat belt at the time of a vehicle crash. A seat belt pretensioner device can be thus achieved in a simple manner without requiring any special power actuator.

16 Claims, 8 Drawing Sheets

SEAT BELT PRETENSIONER DEVICE POWERED BY VEHICLE BODY DEFORMATION

TECHNICAL FIELD

The present invention generally relates to an automotive vehicle body structure for improving the vehicle crash safety, and in particular to a seat belt pretensioner device which is powered by a relative displacement between two parts of the vehicle body at the time of a vehicle crash.

BACKGROUND OF THE INVENTION

In recent years, with the aim of improving the safety of vehicle occupants at the time of a vehicle crash, various vehicle body structures have been proposed in which the deformation mode of the part of a vehicle body other than the passenger compartment is appropriately controlled in such a manner that the deceleration of the passenger compartment of the vehicle is reduced, and the deformation would not reach the passenger compartment (Japanese patent laid-open publication No. 07-101354 and others).

At the time of a vehicle crash, the deceleration of a vehicle occupant who is restrained to a vehicle seat by an occupant restraint system such as a seat belt rises sharply only when the forward inertia force acting on the occupant is received by the seat belt. As it is not possible to eliminate the tendency of the seat belt to act as a spring, the vehicle occupant moves forward under the inertia force, and the deceleration of the vehicle occupant reaches the peak value when the elongation of the seat belt reaches the maximum value. The greater the displacement of the vehicle occupant under the inertia force, the higher the peak value of the vehicle occupant becomes, and the peak value of the vehicle occupant acceleration is said to exceed the average deceleration of the vehicle body.

In view of minimizing the injury to the vehicle occupant at the time of a vehicle crash, the maximum acceleration (deceleration) of the vehicle occupant should be reduced. The vehicle occupant deceleration is dictated by the waveform (time history) of the vehicle body deceleration when the vehicle occupant is held integrally with the vehicle body by the seat belt. As shown in FIG. 9, to minimize the vehicle occupant deceleration (G1), a preferred waveform (G2) of the deceleration of the vehicle body (seat) should consist of an initial interval (a) characterized by a high deceleration, an intermediate interval (b) characterized by an opposite deceleration, and a final interval (c) characterized by an average deceleration.

To achieve such a waveform, proposals have been made in copending U.S. patent application Ser. No. 09/377,366 now U.S. Pat. No. 6,186,574 and Ser. No. 09/376,888 now U.S. Pat. No. 6,193,296 both filed on Aug. 18, 1999, to impart a relative deceleration and acceleration to the vehicle seat or the member carrying the vehicle seat with respect to the main part of the vehicle body so that the vehicle occupant may experience a deceleration from an early stage of a vehicle crash, and the maximum vehicle occupant deceleration may be reduced by distributing the inertia force acting on the vehicle occupant over a longer period of time. Similar proposals have been made in additional copending patent applications. This can be accomplished either by using a power actuator or solely through the controlled deformation of the various members of the vehicle body including that of the G-control member. The contents of these applications are hereby incorporated in this application by reference.

In such an arrangement, if there is any excessive slack in the seat belt, even though the seat may undergo a relatively controlled time history of deceleration itself, the failure to properly restrain the occupant causes a delay in the time history of deceleration for the occupant, resulting in a relatively sharp rise in the occupant's deceleration level as the seat belt finally becomes effective in restraining the occupant. In other words, for such an arrangement to be effective, it is essential to provide a suitable seat belt pretensioner system so that the occupant may be effectively restrained to the occupant seat from an early phase of a crash.

When a G-control member is used in a vehicle body, the vehicle body not only deforms in a controlled manner but also a controlled relative displacement occurs, in particular, between the G-control member and the rest of the vehicle body. Such a displacement can be conveniently used as a power source for a seat belt pretensioner device. This can be accomplished by providing at least one of the anchor points of the seat belt in a part of the vehicle body which is not part of the) G-control member.

This however may create an inconvenience because the position of the anchor point may significantly change as the position of the occupant seat is adjusted in the fore-and-aft direction to accommodate for the difference in the build of the occupant and ensure the comfort of the occupant. For instance, if the anchor point is provided in the rear end of the seat slide so as to ensure the function of the restraint system over the entire range of the seat slide movement, some problems arise when the seat is placed at the front most position because the anchor point is so far away from the vehicle occupant that the vehicle occupant experiences some difficulty in reaching the anchor point which may consist of a buckle provided with a latch device that needs to be manually operated.

BRIEF SUMMARY OF THE INVENTION

In view of such a recognition by the inventors, a primary object of the present invention is to provide a seat pretensioner device which does not require any power source.

A second object of the present invention is to provide a seat pretensioner device which enhances the performance of a G-control vehicle body which minimizes the peak value of the deceleration for the vehicle occupant at the time of a vehicle crash.

A third object of the present invention is to provide a seat pretensioner device which makes use of a relative displacement between two parts of the vehicle body, but allows the fore-and-aft adjustment of the seat without causing any inconvenience.

According to the present invention, such objects can be accomplished by providing a seat belt pretensioner device for a seat belt having a plurality of anchor points attached to different parts of a vehicle body, the vehicle body including a G control vehicle body member which deforms in a different pattern from a remaining part of the vehicle body at the time of a vehicle crash; wherein: at least one of the anchor points, which typically consists of a seat belt buckle, is attached to the G control vehicle body member via a force transmitting member which is adapted to move the one anchor point in a direction to increase a tension of the seat belt at the time of a vehicle crash.

Thus, a seat belt pretensioner device can be achieved in a simple manner without requiring any special power actuator. According to a preferred embodiment, the power transmitting member comprises a flexible member such as a cable member having one end attached to the G control member, and an anchor point guide member supporting the anchor point and having another end of the cable member attached thereto, the anchor point guide member being adapted to move in a direction to increase a tension of the seat belt. Thus, it is possible to use a relative displacement of vehicle body parts which may be significantly remote from the anchor point in question.

The anchor point is required to be guided to move along a prescribed path, and it can be readily accomplished if the anchor point guide member comprises an arm member pivotally supported by a seat and having the anchor point attached to a free end thereof. The arm member may also consist of a pulley member. In this case, the cable member may be passed around an arcuate section of the pulley member for a desired motion of the anchor point.

A vehicle seat is normally required to be adapted to fore-and-aft adjustment, and this should not interfere with the pretensioner device of the present invention even when the anchor point is integral with the vehicle seat. If the anchor point guide member comprises a pulley member, the movement of the anchor point that is caused by the fore-and-aft adjustment of the vehicle seat can be minimized by controlling the way the cable member is paid out from the arcuate section of the pulley member.

The G control member may take a number of different forms without departing from the principle of the present invention. For instance, the G control member may be disposed under a floor panel while the cable member is attached to the G control member at one end thereof, and is passed through an opening formed in the floor panel to be attached to the anchor point guide member.

According to a preferred embodiment of the present invention, the seat is connected to the G control member, and the cable member is connected between the anchor point guide member and the G control vehicle body member, a cable guide member being provided in the opening of the floor panel and adapted to push an intermediate part of the cable member at the time of a vehicle crash. In this case, a seat adjustment arrangement may be provided between the seat and the G control member.

Alternatively, the seat may be attached to the floor panel while the cable member is connected between the anchor point guide member and the G control vehicle body member, a cable guide member being provided in the opening of the floor panel and adapted to push an intermediate part of the cable member at the time of a vehicle crash. In this case, a seat adjustment arrangement may be provided between the seat and the floor panel member.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
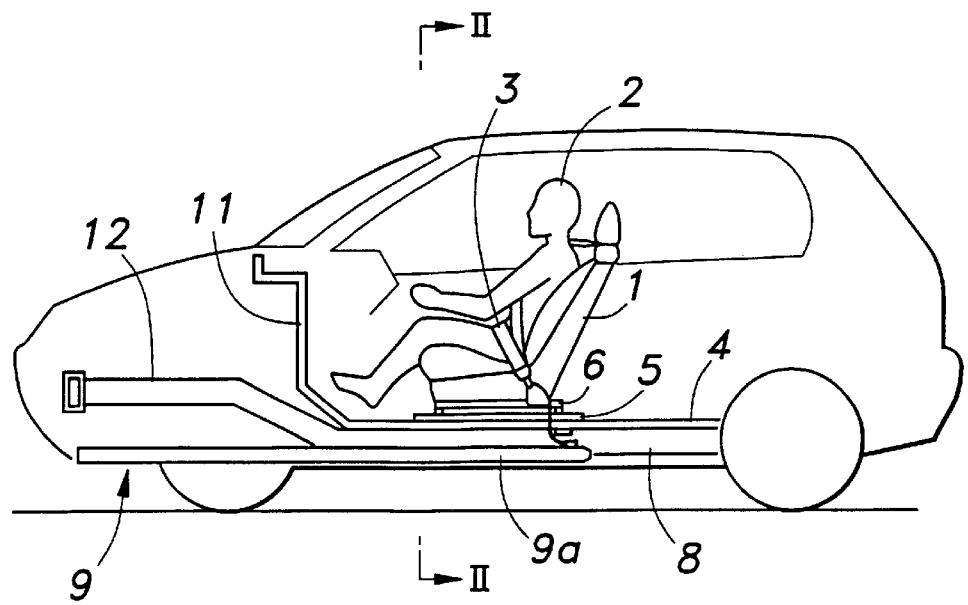
FIG. 1 is a simplified side view of a vehicle body embodying the present invention.

FIG. 1 illustrates the general structure of a vehicle embodying the present invention. To restrain a vehicle occupant 2 with respect to a seat 1, the seat 1 is fitted with a seat belt 3. The seat 1 is fixedly supported on a seat frame 1a, and the seat frame 1a is in turn mounted on a seat base frame 6 via a seat slide arrangement 5 as shown in the sectional view of FIG. 2 taken along line II—II of FIG. 1 so that the seat 1 may be moveable in the fore-and aft direction with respect to the seat base frame 6. The seat base frame 6 is in turn placed on a floor panel 4, forming an integral part of the vehicle body, so as to be moveable with respect to the floor panel 4 as described hereinafter. In the illustrated embodiment, the seat belt anchors including a seat belt buckle 15 are all provided in the seat 1 or the seat frame 1a which is integral with the seat 1. However, at least one of the anchor points, such as the shoulder anchor point, may be connected to a fixed part of the vehicle body such as an upper part of the center pillar without departing from the spirit of the present invention.

A side sill 7 having a rectangular cross section is fixedly attached to each side of the floor panel 4, and a floor frame 8 having a U-shaped cross section is fixedly attached to the lower surface of the floor panel 4 so as to extend in the fore-and-aft direction under each seat 1. These members reinforce the floor panel 4 which has a generally planar configuration.

Figure 3:
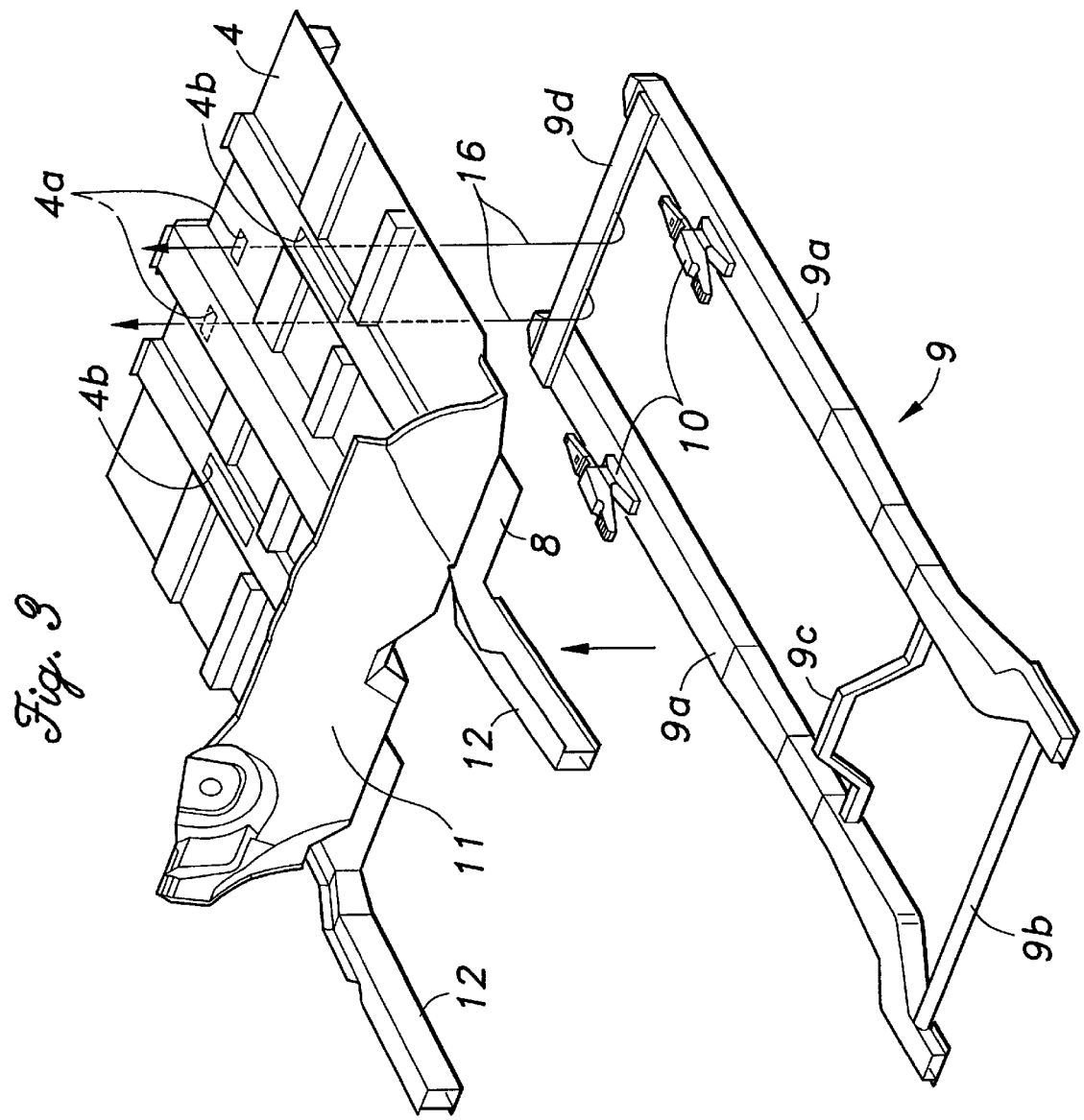
FIG. 3 is an exploded perspective view of the floor panel and the G control frame of the vehicle body.

A G control frame 9 formed as a ladder frame is provided under the middle part of the floor panel 4. Referring to FIG. 3, the G control frame 9 comprises a pair of longitudinal frame members 9a extending in the fore-and-aft direction of the vehicle body on either side thereof, and a front cross bar 9b, a middle cross frame 9c and a rear cross bar 9d extend across the longitudinal frame members 9a.

The front end of the floor panel 4 is integrally connected to a bulkhead panel 11 which obliquely rises toward the front end of the vehicle body, and a pair of side frames 12 extend in the forward direction, one next to the other, from the floor frame 8 beyond the bulkhead panel 11.

Figure 2:
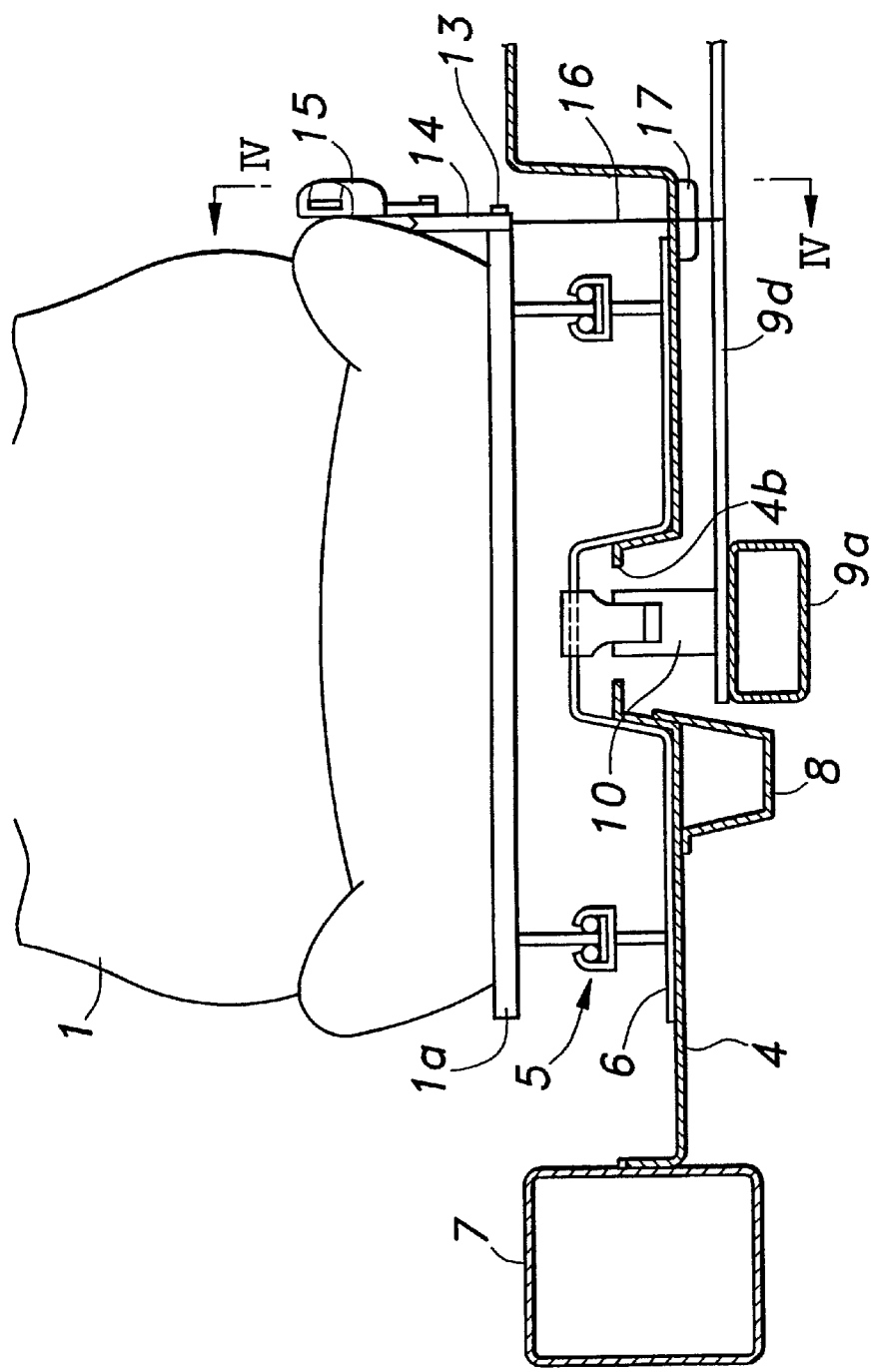
FIG. 2 is a view taken along line II—II of FIG. 1.

As shown in FIGS. 2 and 3, the G control frame 9 is integrally provided with a pair of coupling members 10 projecting upward from the upper surface thereof, and are each passed through an opening 4b provided in the floor panel 4 to engage the corresponding seat base frame 6. Thus, the seat base frame 6, along with the seat 1 and the seat frame 1a, is integrally attached to the G control frame 9 while the fore-and-aft position of the seat 1 can be adjusted with respect to the seat base frame 6 via the seat slide arrangement 5.

Figure 9:
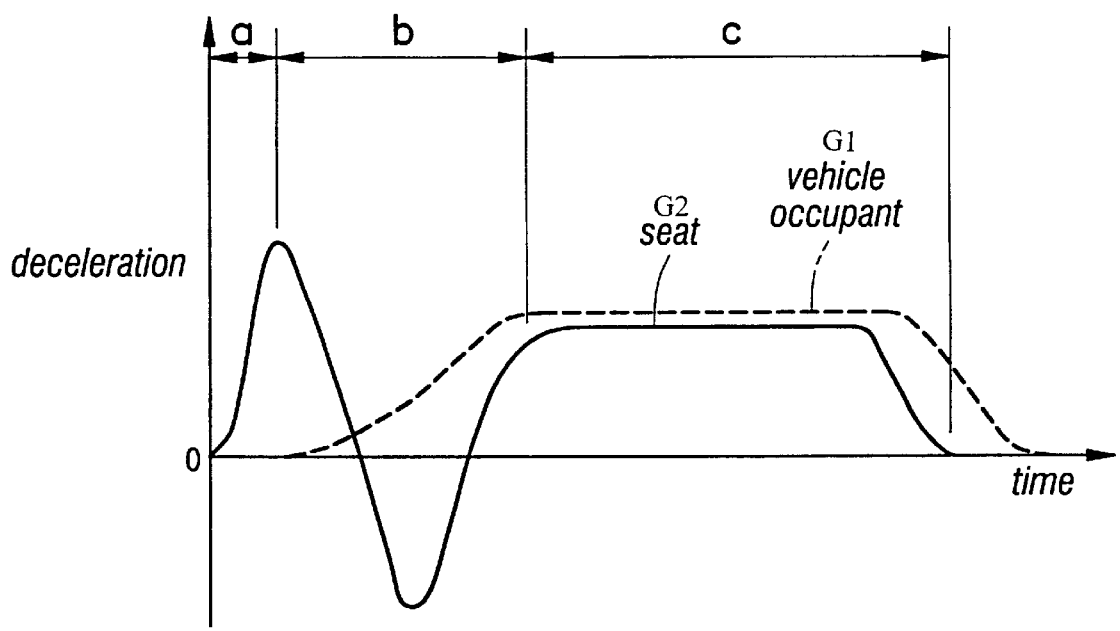
FIG. 9 is a graph showing a desired pattern of deceleration of the seat and the vehicle occupant at the time of a vehicle crash.

In this vehicle having the above described structure, at the time of a frontal crash, following the deformation of the front bumper, the body front portion starts collapsing, and the impact load is applied to both the side frames 12 and the G control frame 9. Due to the difference in rigidity against the impact load, the side frames 12 first undergo a compressive deformation, and the G control frame 9 undergoes a compressive deformation thereafter. Thus, the impact of the crash is immediately applied to the vehicle seat 1 via the G control frame 9, and the G control frame 9 is thereafter subjected to a forward acceleration to avoid any excessive rise in the deceleration level by using a power source or a control deformation of the vehicle body although it is not shown in the drawings. FIG. 9 shows the time history of a typical frontal crash which can be achieved by the use of G control member. For more detailed description of the vehicle body structure including a G control member, reference should be made to copending U.S. patent applications Ser. Nos. 09/377,366 and 09/376,888 both filed on Aug. 18, 1999, and additional copending applications of later dates.

Figure 4:
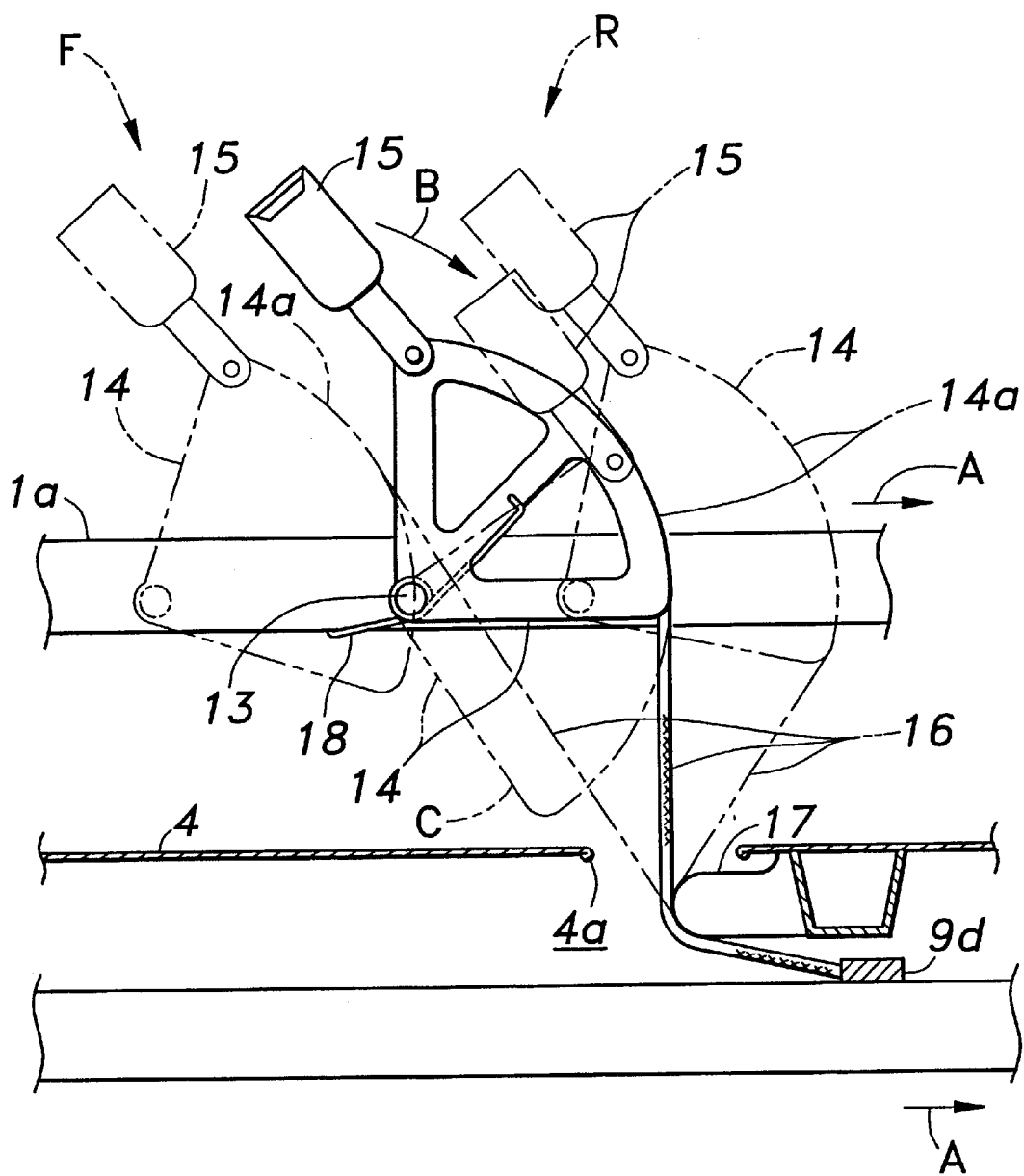
FIG. 4 is an enlarged side view of the vehicle body.

Referring to FIGS. 2 and 4, a fan-shaped pulley member 14 is pivotally mounted on a side of the seat base frame 6 by a pivot pin 13 so as to be rotatable in the vertical direction. A seat belt buckle 15 is attached to a part of the pulley member 14. A torsion coil spring 18 urges the pulley member 14 in the upward direction or in counter clockwise direction as seen in FIG. 4. Thus, one of the anchor points of the seat belt, which consists of the seat belt buckle 15 in this embodiment, is guided by the pulley member 14 along an arcuate path rearward and downward.

An end of a cable 16 is attached to the pulley member 14, and is passed around the arcuate section 14a of the pulley member 14. The other end of the cable 16 extends downward through an opening 4a provided in the floor panel 4, and is attached to the rear cross bar 9d of the G control frame 9. A cable guide 17 is attached to the floor panel 4 to allow the cable 16 to be guided along a curved path without causing any undesired wear or stress to the cable 16. In the illustrated embodiment, the cable 16 extends vertically downward from the pulley member 14, and is bent rearward around the cable guide 17 to be attached to the rear cross bar 9d of the G control frame 9. Under normal condition, the cable 16 is kept taut under the spring force of the torsion coil spring 18.

In the vehicle structure described above, in an initial phase of a frontal crash, because the side frame 12 (floor panel 4) undergoes a compressive deformation before the G control frame 9 does, as mentioned earlier, the longitudinal frame members 9a and the seat base frame 6 move rearward with respect to the floor panel 4 as indicated by arrow A in FIG. 4. As a result, the cable 16 connected to the longitudinal frame member 9a (rear cross bar 9d) is sharply bent by the cable guide 17, which, along with the floor panel 4, moves forward with respect to the seat base frame 6 and the G control frame 9. As a result, the pulley member 14 is turned in a clockwise direction, and this causes a downward and rearward movement of the seat belt buckle 15 as indicated by arrow B so that an addition tension is applied to the seat belt 3 which is connected to the buckle 15. This causes the vehicle occupant 2 to be restrained to the seat 1 more securely, thereby preventing the vehicle occupant 2 from being thrown forward. This is advantageous in controlling the deceleration of the vehicle occupant, and helps achieve the desired purpose of the G control frame.

Normally, a vehicle seat is required to be provided with an arrangement for adjusting the fore-and-aft position of the seat so as to suit the build of the seat occupant. However, if any one of the anchor points of the seat belt is attached to a stationary part of the vehicle body near the seat, the fore-and-aft adjustment of the seat would cause the anchor point, such as a seat belt buckle, to change in position so that the occupant may experience some difficulty in accessing the anchor point such as a seat belt buckle. The anchor point may also consist of the one which is adjacent to the shoulder of the vehicle occupant which may be adapted for a vertical adjustment. The illustrated embodiment is designed to address such a problem.

In the illustrated embodiment, the pulley member 14 is attached to the seat frame 1a which is integral with the seat 1 so that the buckle 15 attached to the pulley member 14 maintains a fixed position relative to the seat 1 without regard to the fore-and-aft movement of the seat 1. In FIG. 4, the positions of the buckle 15 when the seat is adjusted to the front most and rear most positions are indicated by imaginary lines and letters F and R, respectively. It is desired that the position or elevation of the buckle 15 relative to the floor panel 4 is desired to be fixed without regard to the fore-and-aft position of the seat 1.

When the seat 1 is at the front most position as indicated by arrow F in FIG. 4, the cable 16 is partly unwound from the arcuate section 14a of the pivotally mounted pulley member 14 as indicated by the corresponding imaginary lines. When the seat is at the rear most position as indicated by arrow R in FIG. 4, the pulley member 14 may tilt slightly, but the elevation of the buckle would not change to any significant extent. Because the elevation of the anchor point 15 would not substantially change without regard to the position of the seat (seat frame 1a), there is no problem in latching the seat belt 3 to the buckle 15, and the fastening and unfastening of the seat belt 3 can be accomplished without any inconvenience.

When the vehicle crashes onto an object, the main part of the vehicle body including the floor panel 4 collapses before the G control frame 9 does so that the floor panel 4 moves forward ahead of the G control frame 9 and the seat 1 in an early phase of a vehicle crash. In other words, the cable guide 17 which is attached to the floor panel 4 advances relative to the G control frame 9 and the seat 1, and pushes the part of the cable 16 extending between the pulley member 14 and the G control frame 9 with the result that the pulley member 14 is turned in a clockwise direction, and the buckle 15 is pulled downward. Thus, the relative displacement between the G control frame 9 and the floor panel 4 increases the tension of the seat belt 3. In other words, this arrangement provides the function of a seat belt pretensioner which is powered by a relative displacement between two parts of the vehicle body such as the floor panel 4 and the G control frame 9.

Figure 5:
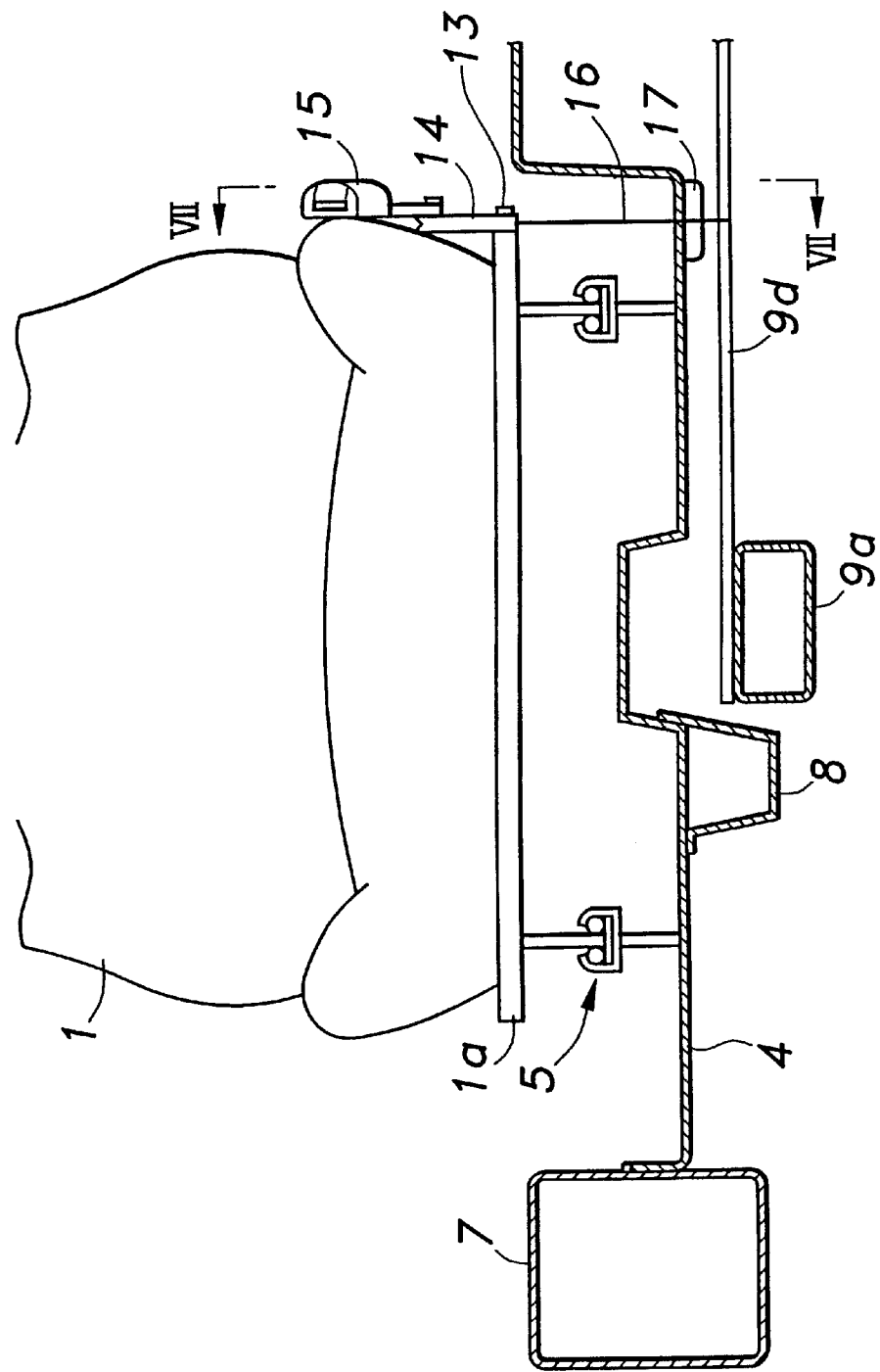
FIG. 5 is a view similar to FIG. 2 showing the second embodiment of the present invention.
Figure 6:
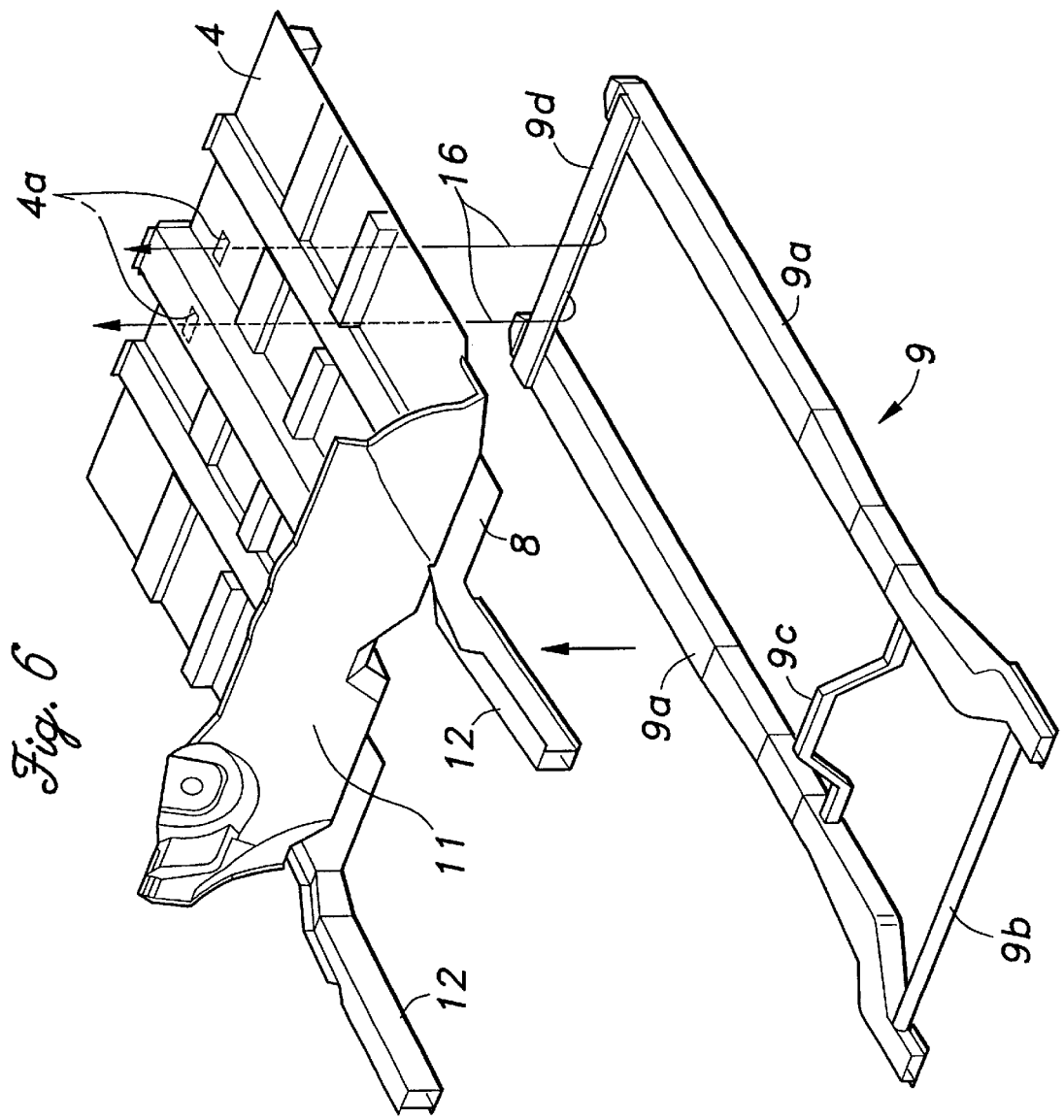
FIG. 6 is a view similar to FIG. 3 showing the second embodiment of the present invention.
Figure 7:
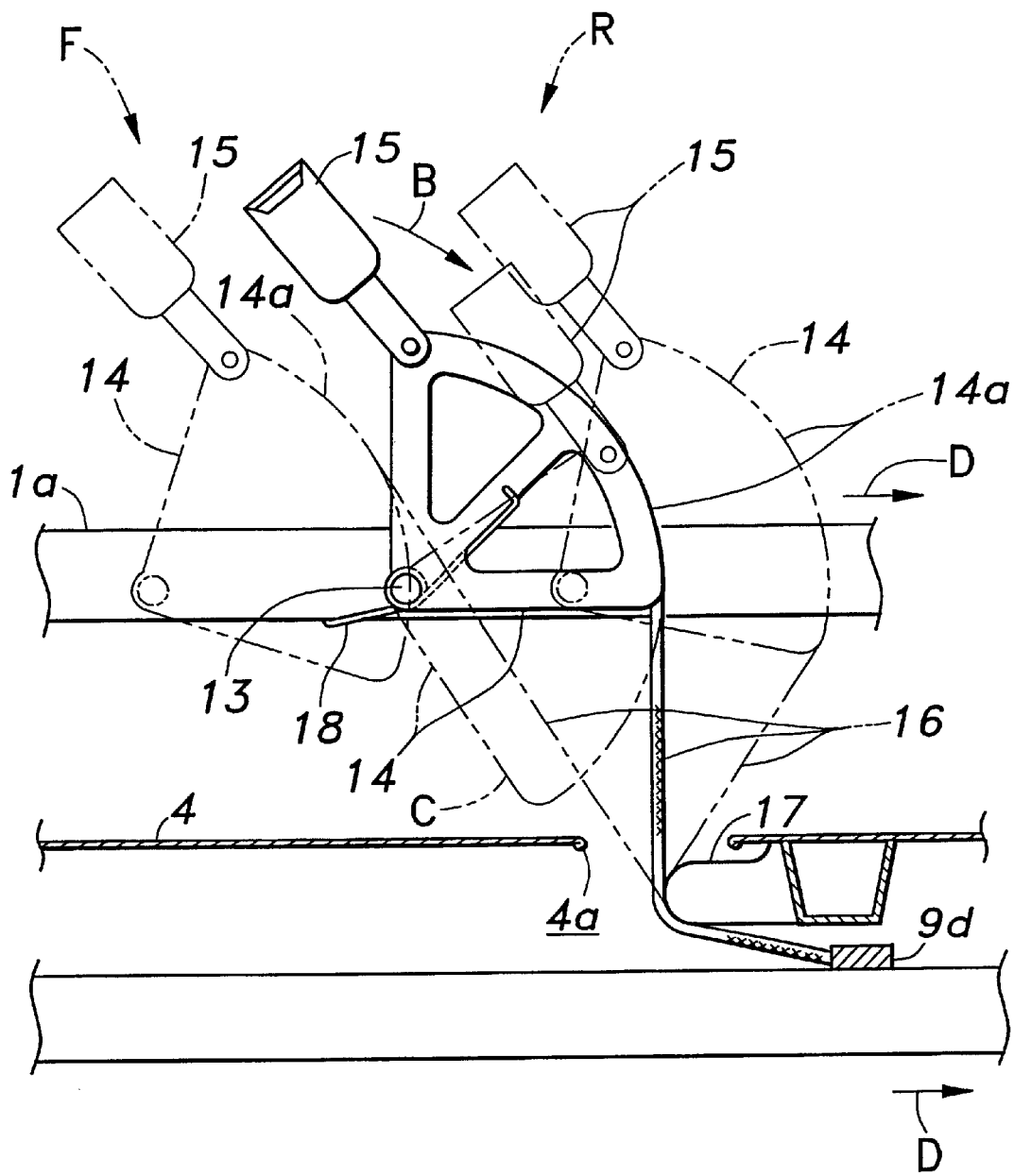
FIG. 7 is a view similar to FIG. 4 showing the second embodiment of the present invention.

As can be readily appreciated by a person skilled in the art from the foregoing description, this arrangement can be applied to any vehicle body which involves a certain relative displacement between two parts of the vehicle body at the time of a vehicle crash. FIGS. 5 to 7 show a second embodiment of the present invention, and the parts corresponding to those of the previous embodiment are denoted with like numerals. In this embodiment, the seat 1 and the seat frame 1a are supported by the floor panel 4 via a seat slide arrangement 5. A lower frame 9 is provided under the floor panel 4, and is adapted to follow a somewhat different collapsing pattern from that of the rest of the vehicle body.

As best shown in FIG. 7, the fore-and-aft position of the seat frame 1a can be adjusted relative to the floor panel 4 without substantially changing the elevation of the seat buckle 15. When the vehicle crashes onto an object, the lower frame 9 which is relatively rigid remains relatively intact in an early phase of the crash while the remaining part of the vehicle body, in particular the floor panel 4, collapses to a more significant extent. Because the seat frame 1a is fixedly attached to the floor panel 4 via the lock mechanism of the seat slide arrangement not shown in the drawings, at the time of the vehicle crash, the seat 1 stays substantially fast with the floor panel 4. Therefore, in the early phase of the vehicle crash, the lower frame 9 moves rearward relative to the floor panel 4 as indicated by arrow D, and the cable guide 17 attached to the floor panel 4 pushes an intermediate part of the cable 16 sideways, causing the pulley member 14 to rotate in clockwise direction and the buckle 15 to be pulled downward.

Figure 8:
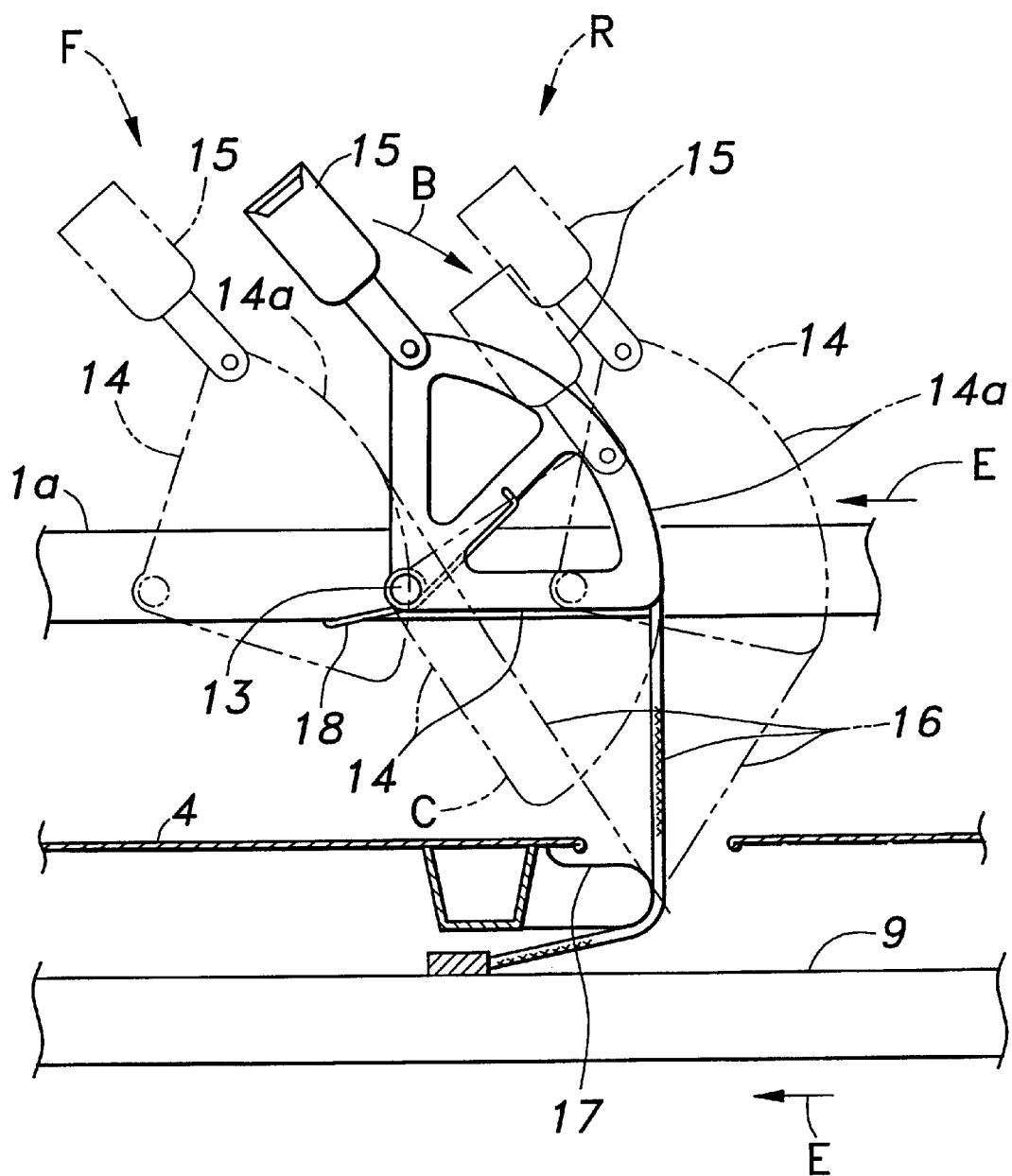
FIG. 8 is a view similar to FIG. 4 showing the third embodiment of the present invention.

Depending on the vehicle body structure, the lower frame 9 may be adapted to collapse before the remaining part of the vehicle body does. FIG. 8 shows such an arrangement, and the parts corresponding to the previous embodiment are denoted with like numerals. This embodiment is similar to the previous embodiment, and the only difference is that the lower frame 9 moves forward relative to the remaining part of the vehicle body at the time of a vehicle crash as indicated by arrow E.

As can be appreciated from the foregoing description, according to the present invention, at the time of a vehicle crash, because the anchor point guide member is moved owing to the relative displacement between two parts of the vehicle body, this motion causes a displacement of the seat belt anchor point, such as a seat belt buckle, in the direction to tension the seat belt so that the restraint of the vehicle occupant at the time of a vehicle crash can be improved. If the cable is passed around an arcuate section of a pivotally mounted pulley member, and can be paid out from the arcuate section of the pivotally mounted member as the seat is moved for slide positional adjustment of the seat, the pivotally mounted pulley member is prevented from rotating to any substantial extent. Thus, the anchor point can be moved with the seat, and the handling of the seat belt at the anchor point is not inconvenienced in any way.

Although the present invention has been described in terms of preferred embodiments thereof, it is obvious to a person skilled in the art that various alterations and modifications are possible without departing from the scope of the present invention which is set forth in the appended claims.

What is claimed is:

1. A seat belt pretensioner device for a seat belt, said seat belt having at least one anchor point, wherein a vehicle body includes a G control vehicle body member which displaces relative to a remaining part of the vehicle body at the time of a vehicle crash; wherein: said at least one anchor point is attached to said G control vehicle body member via a force transmitting member which is adapted to move said at least one anchor point in a direction to increase a tension of said seat belt at the time of a vehicle crash.

2. A seat belt pretensioner device according to claim 1, wherein said at least one anchor point includes a seat belt buckle.

3. A seat belt pretensioner device according to claim 1, wherein said force transmitting member comprises a cable member having one end attached to the G control member, and an anchor point guide member supporting said at least one anchor point and having another end of said cable member attached thereto, said anchor point guide member being adapted to move in a direction to increase a tension of said seat belt.

4. A seat belt pretensioner device according to claim 3, wherein said anchor point guide member comprises an arm member pivotally supported by a seat and having said at least one anchor point attached to a free end of said arm member.

5. A seat belt pretensioner device according to claim 4, wherein said arm member comprises a pulley member including an arcuate section, and said cable member is passed around said arcuate section.

6. A seat belt pretensioner device according to claim 3, wherein said G control member is disposed under a floor panel, and said cable member is attached to said G control member at one end thereof, and is passed through an opening formed in said floor panel to be attached to said anchor point guide member.

7. A seat belt pretensioner device according to claim 6, wherein said seat is connected to said G control member, and said cable member is connected between said anchor point guide member and said G control vehicle body member, a cable guide member being provided in said opening of said floor panel and adapted to push an intermediate part of said cable member at the time of a vehicle crash.

8. A seat belt pretensioner device according to claim 7, wherein a seat adjustment arrangement is provided between said seat and said G control member.

9. A seat belt pretensioner device according to claim 6, wherein said seat is attached to said floor panel, and said cable member is connected between said anchor point guide member and said G control vehicle body member, a cable guide member being provided in said opening of said floor panel and adapted to push an intermediate part of said cable member at the time of a vehicle crash.

10. A seat belt pretensioner device according to claim 9, wherein a seat adjustment arrangement is provided between said seat and said floor panel member.

11. A seat belt pretensioner for increasing tension in a seat belt during a vehicle crash, comprising:

a force transmitting member, connected to a first portion of a vehicle and at least one anchor of said seat belt, said force transmitting member being capable of increasing tension in said seat belt by coupling a displacement of said first portion of said vehicle with respect to another portion of said vehicle during a crash, to said at least one anchor.

12. The seat belt pretensioner of claim 11, wherein said at least one anchor includes a seat belt buckle.

13. The seat belt pretensioner of claim 11, wherein said force transmitting member comprises:

a cable member;

a spring member; and an anchor guide member attached to said at least one anchor;

wherein said cable member is connected between said first portion of said vehicle body and said anchor guide member and held taut by said spring member.

14. The seat belt pretensioner of claim 13, wherein said anchor guide member comprises an arm member pivotally supported by a seat and having said at least one anchor attached to a free end thereof.

15. The seat belt pretensioner of claim 14, wherein said arm member comprises a pulley member including an arcuate section, and said cable member is passed around said arcuate section.

16. The seat belt pretensioner of claim 13, wherein said another portion of said vehicle body is a floor panel having an opening, and said cable member is passed through said opening of said floor panel.

* * * * *